United States Patent [19]

Angella et al.

[11] Patent Number: 4,717,520
[45] Date of Patent: Jan. 5, 1988

[54] PROCESS FOR THE NETLIKE OPENING OF FIBRILLED FILMS

[75] Inventors: Franco Angella, Villafranca Lunigiana; Adriano Grondona; Andrea Vittone, both of Milan, all of Italy

[73] Assignee: Moplefan S.p.A., Milan, Italy

[21] Appl. No.: 804,822

[22] Filed: Dec. 5, 1985

[51] Int. Cl.⁴ .................. B29D 28/00; B29C 55/08
[52] U.S. Cl. .................. 264/147; 264/235; 264/288.8; 264/346; 264/DIG. 47
[58] Field of Search ............ 264/156, DIG. 47, 51, 264/147, 288.8, 235, 346

[56] References Cited

U.S. PATENT DOCUMENTS

| | | | |
|---|---|---|---|
| 3,642,967 | 2/1972 | Doll | 264/51 |
| 3,790,652 | 2/1974 | Colijn et al. | 264/51 X |
| 3,954,933 | 5/1976 | Rasmussen | 264/147 X |
| 4,426,343 | 1/1984 | Vittone et al. | 264/147 |

*Primary Examiner*—Philip Anderson
*Attorney, Agent, or Firm*—Stevens, Davis, Miller & Mosher

[57] ABSTRACT

Process for the netlike opening of fibrilled polymeric films, said process consisting in conveying to an opening device of the conventional type (based, for instance, on diverging transferring elements and on lateral film pulling elements such as clamps, grippers or pins, which engage the film at its edges and which are fixed on said traverse elements) the fibrilled film of an undulated or corrugated shape, with the front of the corrugations or waves perpendicular to the direction of the transferring motion, so that the length of the film between the lateral consecutive pulling elements be in excess with respect to the distance between said elements, wherefore said excess will compensate the longitudinal shrinkage that the film will suffer during the transversal opening.

2 Claims, 4 Drawing Figures

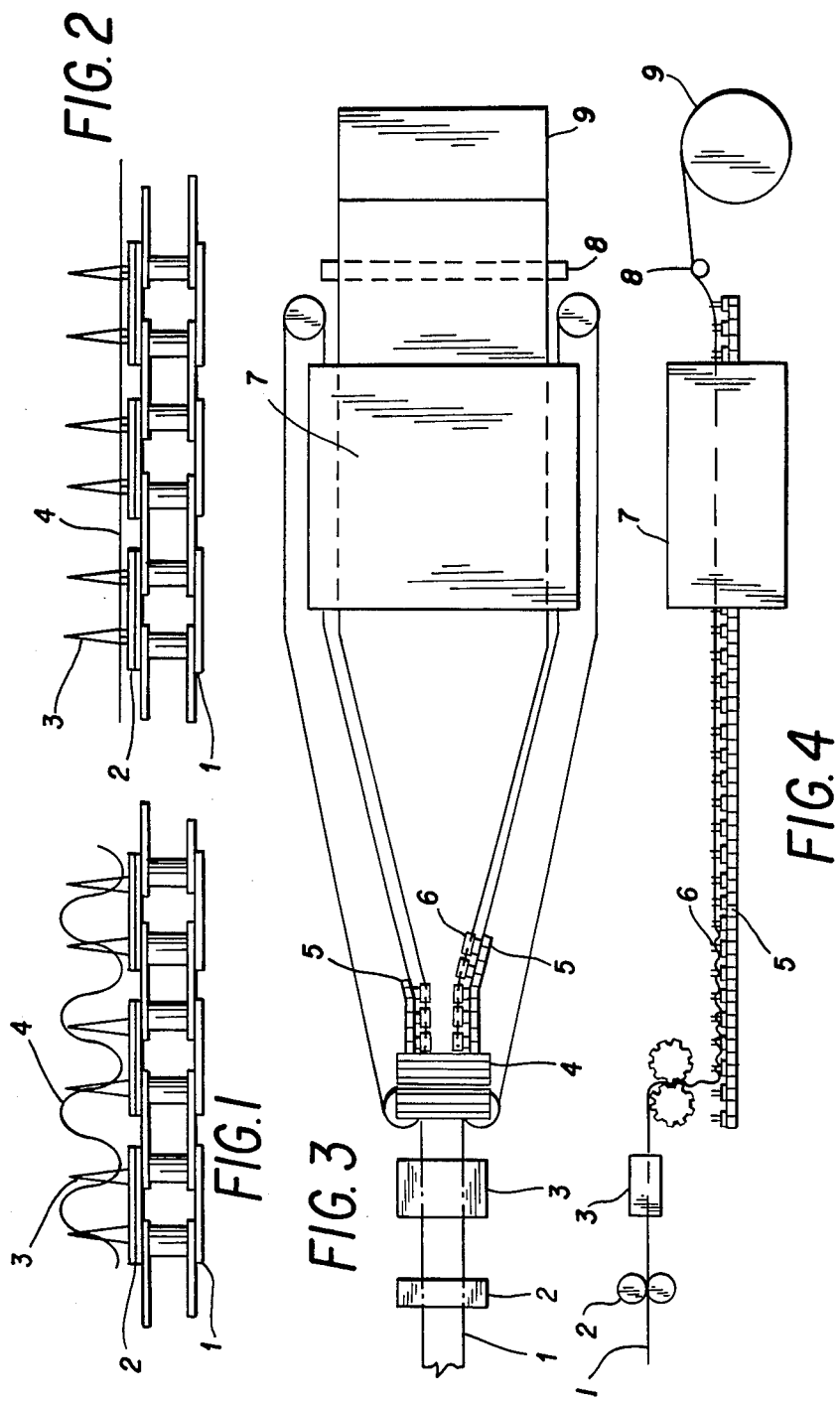

PROCESS FOR THE NETLIKE OPENING OF FIBRILLED FILMS

BACKGROUND OF THE INVENTION

The crosswise stretching of the fibrilled film is a difficult operation owing to the extreme lightness and delicacy of the material to be handled, because of transversal shrinkage phenomenon due to the crosswise opening and to the poor resistance of the fibrils to the longitudinal sliding stresses, all factors which have hindered the use of the conventional opening systems used in the field of textiles, such as diverging clamps or pins carrying chains, or other rigid diverging elements of kinds.

Various methods have been suggested in the art for this purpose. Said methods are however not completely suited for overcoming the above indicated drawbacks.

According to the method disclosed in French Pat. No. 1.331.095, said stretching is achieved by holding the film compressed between two stretchable and elastical films which are stretched crosswise with a simultaneous longitudinal shrinkage.

According to European Pat. No. 11.371 there is carried out an opening of tubularly shaped fibrilled films, by passing the films through an expansion form, and obtaining the compensation of the longitudinal shrinkage by using different feeding speeds and film winding-up speeds.

Lastly, in the European patent application No. 21.017, filed in the name of the Applicant, the opening of the fibrilled film is achieved by means of two sets of clamps flexibly connected to each other, which grip the film while it runs on two diverging guides, and which are dragged along by the film itself and are free to draw near each other during the opening of the film, thereby compensating the longitudinal shrinkage of the film itself.

Although this last method is particularly effective, it requests the use of particularly complex devices, to detriment of the economy of the production.

THE PRESENT INVENTION

The object of the present invention is to provide a simple and effective method for achieving the transversal or crosswise, netlike opening of a fibrilled film.

Fibrilled films are, as known, prevalently monooriented polymeric films which underwent splitting or fissuring operations. Such operations are carried out by points, blades or other mechanical disgregation means which make a plenty of slits or fissures in the polymeric film, prevalently in longitudinal direction, according to the orientation of the film itself. Method and device of present invention are based on feeding to opening devices of a traditional type (such as for instance clamps or pins rigidly fixed between them on diverging translation apparatuses such a chains or belts) an excess of film length compared with the length tath would be justified by the distance between the consecutive lateral pulling elements themselves, so that the difference between the actual length of the film on the feeding side and the corresponding distance between the consecutive pulling elements will constitute the shrinkage which said excess will compensate.

In order to obtain such an excess of film on the lateral pulling elements, the film is fed, at the inlet of the opening device, in either a non permanent or semi-permanent undulated form, with the front of the undulations perpendicular to the direction of the feeding. The pulling elements, fixed on chains, belts or any other such like continuous means that will allow the contemporaneous longitudinal advancement and the transversal diverging, are such as to initially retain the undulations of the slitted or fibrilled film, but at the same time they are such as to allow the undulations to stretch longitudinally when the film shrinks in the direction of its advancement, thereby recovering the excess of fed film.

Said pulling elements may consist of pins, fixed studs, springy elements shaped in such a form as to keep the undulated (corrugated) film solidly connected only in a few points to the advancement and diverging means.

Devices of this kind have been known and used since long in textile industry in thermosetting operations on textiles, in which there is required to maintain the fabric itself in a position of open meshes.

As pulling elements there proved to be of particular usefulness, in the process of this invention, the elements in the form of studs, pins, points or the like, capable of inserting themselves into the meshes present on the edges of the fibrilled film, and which have thus a diameter or size of their cross-section smaller than the greater size of the meshes themselves. Preferably said size or diameter of the pulling elements is not greater than half of the greater size of the meshes in which they are inserted, so as to help to a certain extent, by means of a certain play inside the mesh itself, the stretching of the film undulations in a longitudinal direction.

The netlike opening process of fibrilled films, object of the present invention, is thus characterized in that it consists in the following operations:

(a) formation of non-permanent or semi-permanent undulations on a prevalently monooriented fibrilled or longitudinally slitted, synthetic polymer film or on a composite film consisting a plurality of such superimposed films, the front of the undulations being substantially perpendicular to the longitudinal axis of the film or such assembly of films;

(b) feeding of the film or of the assembly of films, containing the undulations, to a pair of continuous translation elements moving in a directin substantially perpendicular to the front of the undulations, and which are mutually diverging from each other and being fitted with elements suited for the lateral pulling of the film;

(c) the optional thermal stabilization of the film, shaped like an open net, by means of a heating at a temperature lower than the melt temperature of the polymer forming the film.

Operation (a) may be achieved by means of techniques known to the Prior Art, for instance under heat, with a pair of toothed wheels or of chains of studs, or by means of a "stuffing box" used for the crimping of yarns.

The diverging translations elements of operation (b) may consist of chains, belts, etc. driven by a motor.

Each pair of film pulling elements, fixed on said translation motion elements, engages the film through the meshes present on the lateral edges of the film itself, and mechanical diverges from each other during the process, thereby opening the undulated film netlike, that stretches during the opening with the consequential flattening of the undulations, due to the longitudianl shrinkage.

The linear feeding rate of the film or combination of superimposed films is, thus, greater than the winding up speed of the open net, and the depth and pitch of the waves or undulations is so adjusted as to compensate the extent of the longitudinal shrinkage of the net.

FIG. I illustrates a stretch of chain (1) at the starting, not stretched stage, carrying small plates (2) on which are fixed, as pulling elements, the pins (3) which grip the undulated film (4).

FIG. II illustrates, using the same numerical symbols, the same chain element in its finally stretched position, in which position the film (4) has shrinked longitudinally.

FIGS. III and IV illustrate the process by an exemplifying schematical but not limiting disposition or outlay of the equipment used, wherein:

(1) is the film or ribbon of a plurality of superimposed fibrilled films;
(2) is a pair of feeding rollers for the film or ribbon;
(3) is a small oven for the preheating of the film or ribbon;
(4) is a pair of gears that impart to the film or ribbon the requested undulations;
(5) is a pair of translation (dragging) chains;
(6) are the pulling elements, herein indicated as pins or studs;
(7) is an oven for the stabilization of the open net,
(8) is a bar for the detaching of the net from the pins (6);
(9) is the winding up reel for the net.

What I claim is:

1. Process for the netlike opening of fibrilled films consisting in the following operations:
    (a) formation of non-permanent or semi-permanent indulations on a prevalently monooriented fibrilled or longitudinally slitted synthetic polymeric film or complex of such superimposed films, the front of the undulations being substantially perpendicular to the longitudinal axis of the film or such combination of films;
    (b) feeding of the film or combination of films, containing the undulations, to a continuous pair of translation elements moving in a substantially perpendicular direction to the front of the undulations and mutually diverging, provided with pulling elements that initially grip the undulations but do not then hinder their spreading due to the longitudinal shrinkage;
    (c) the optional thermal stabilization of the film in the open-net condition by means of heating it at a temperature lower than the melt temperature of the polymer of which is made the film.

2. Process according to claim 1, characterized in that the lateral pulling elements for dragging the film consists of points, pins, studs or the like, and which have a diameter not greater than half the greater size of the meshes of the fibrilled film with which they inter-mesh.

* * * * *